May 20, 1969    G. F. BARTLETT ET AL    3,445,204
ELECTRICALLY OPERATED IGNITER FOR SMUDGE POTS
Filed Aug. 24, 1967
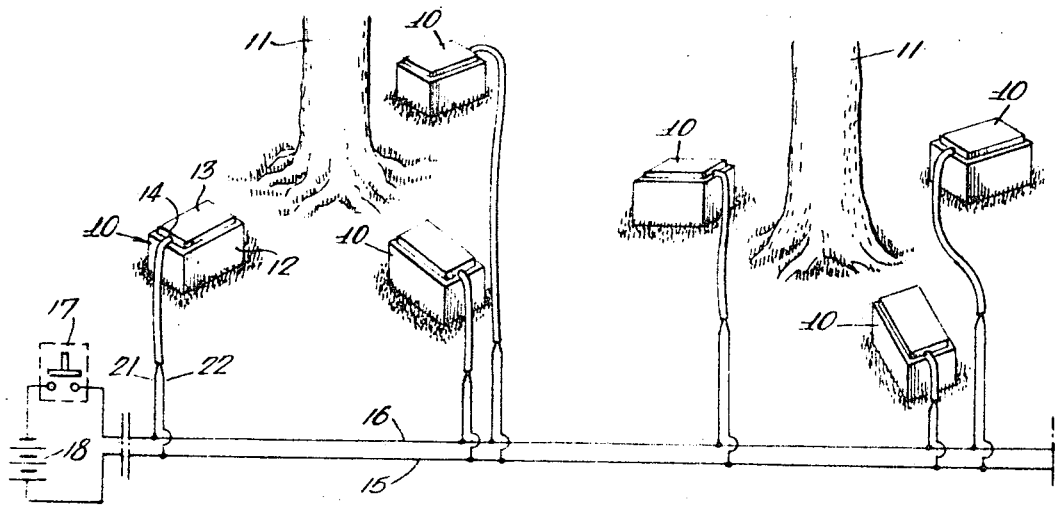
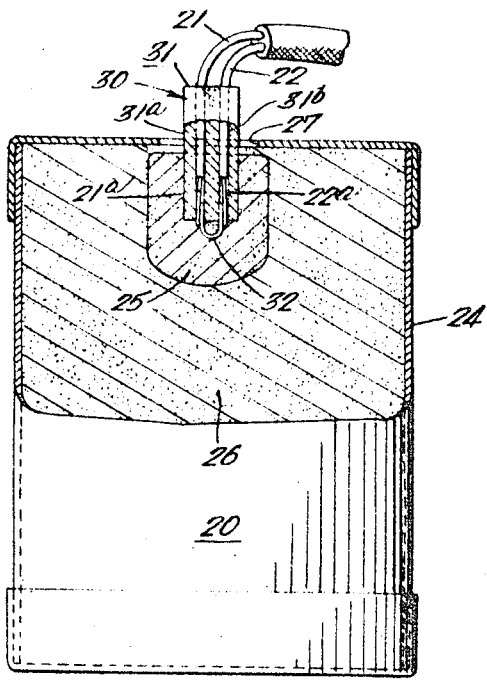
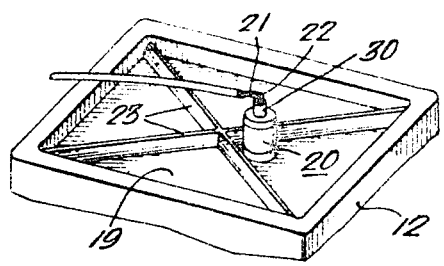
INVENTORS:
GEORGE F. BARTLETT
SAMUEL SNAIDMAN
BY Howson & Howson
ATTYS.

United States Patent Office 3,445,204
Patented May 20, 1969

3,445,204
ELECTRICALLY OPERATED IGNITER FOR SMUDGE POTS
George F. Bartlett, Paramus, and Samuel Snaidman, Boonton, N.J., assignors to Standard Railway Fusee Corp., Baltimore, Md., a corporation of Massachusetts
Filed Aug. 24, 1967, Ser. No. 663,039
Int. Cl. F23q 21/00
U.S. Cl. 44—36                      5 Claims

ABSTRACT OF THE DISCLOSURE

Apparatus for electrically igniting one or more smudge pots substantially simultaneously, the igniter including a combustible, substantially closed container. Inside the container is a low flash point primary ignition substance and a secondary slow burning fuel having a higher flash point. In the upper portion of the container is an aperture and passing therethrough, a pair of lead wires. A lighter, positioned in the primary ignition substance, includes insulating means separating the lead wires and a resistance wire which electrically terminates the wires.

SUMMARY OF THE INVENTION

The present invention relates to ignition apparatus and a system, more particularly it relates to electrically operated igniters for smudge pots, which smudge pots may be positioned at various locations and which may be ignited simultaneously.

In areas where citrus and other fruits are grown, unexpected freezing temperatures can ruin an entire crop in a single night and virtually economically ruin the fruit grower. In order to prevent or to reduce substantially the chances of severe frost damage, it is customary practice to employ smudge pots throughout the orchard, sometimes two to three smudge pots per tree being necessary in order to provide sufficient heat to prevent the severe frost damage. In an orchard with a great number of trees it is necessary to commence manual ignition of the smudge pots when the temperature reaches approximately 35° in order that the smudge pots may all be lighted before the temperature drops below 32°. Manual ignition of the pots is time consuming and entails a lot of work. Many times the temperature after dropping very close to freezing will remain above freezing for the remainder of the night and thus the smudge pots lit when the temperautre approaches the freezing point are wasted as well as the time and effort necessary to ignite all of the smudge pots by hand.

Other uses for smudge pots where similar problems occur is in concrete curing where the temperature may drop below freezing and there is a substantial risk that the free water entrained within the concrete may freeze. Additionally, in private air strips a lighting failure can be disastrous and it is necessary to provide sumdge pots along the runways to give the pilots a direction and an outline of the field for landing. Also, in certain areas where it is necessary to provide emergency barn heat for the farmer or in other applications where a ready source of heat or light is required, especially on an emergency basis, smudge pots are a convenient source of such heat or light.

To this end, it is a principal object of the present invention to provide an electrically operated igniter for smudge pots and a system for igniting a plurality of smudge pots substantially simultaneously.

Another object of the present invention is to provide an electrically operated igniter for smudge pots which is inexpensive to manufacture and is economical to use as to savings in time in igniting and wasteful unnecessary ignitions.

Still another object of the present invention is to provide an electrically operated igniter for smudge pots which may be operated remotely.

Still another object of the present invention is to provide a system for igniting a plurality of smudge pots substantially simultaneously or in groupings, as desired.

Other objects and a fuller understanding of the invention may be had by referring to the following specification and claims taken in conjunction with the accompanying drawings in which:

FIG. 1 is a schematic view of a typical smudge pot arrangement in an orchard and showing how the igniters of the present invention may be connected to the smudge pots so as to be ignited simultaneously;

FIG. 2 is a fragmentary sectional view of a typical smudge pot with an igniter of the present invention positioned therein;

FIG. 3 is a fragmentary perspective view illustrating how the igniter of the present invention may be positioned relative to the smudge pot, with the cover of the smudge pot removed; and FIG. 4 is an enlarged fragmentary sectional view taken along line 4—4 of FIG. 2.

Referring now to the drawings, and especially FIG. 1 thereof, a plurality of smudge pots 10 are shown positioned around the base of trees 11 in an orchard. As shown, each of the smudge pots includes a base 12 and a covering lid 13 for keeping moisture out of the smudge pot until it is ready to be used. As shown in FIG. 1, entering through a suitable aperture 14 in the cover 13 are a pair of lead wires 21, 22 which connect to an igniter 20 (see FIG. 2) enclosed by the cover 13, and at the other end connect to power supply leads 15 and 16 which, through a switch 17, may be connected to a source of E.M.F., in the present instance a battery 18.

A typical smudge pot 10, such as the type manufactured by Sinclair under the trade name "Dinoheat" is shown in FIGS. 2 and 3 with the igniter 20 in position. As shown, the base 12 is composed of a lightweight porous concrete which of course cannot rust or deteriorate even after long exposure. Interiorly of the base is a volatile fuel element, in the present instance a solid fuel element 19 comprising paraffin. Across the upper portion of the paraffin fuel 19 is, and as best shown in FIG. 3, an igniter wick 23, in the present instance composed of a compressed paper. Ignition takes place along the pressed paper igniter wick 23 which sustains burning of the fuel 19 until the unit has heated to the point that the concrete provides wicking.

In accordance with the invention an electrically operated igniter 20 may be positioned on top of the fuel element 19 and cause combustion, when actuated, of the wick 23 and the fuel 19. To this end, and as best shown in FIG. 4, the igniter 20 includes a combustible container 24 composed of a material such as cardboard, and includes a primary and secondary ignition substance 25 and 26 respectively. In the upper portion of the container 24 is means defining an aperture 27 and an electrically operated lighter 30, fittable through the aperture and positioned in the container 24. The lighter 30 includes the lead wires 21 and 22 the terminal ends 21a and 22a of which have been stripped of their insulation. Insulating means, in the present instance a dielectric insulator 31, maintains the terminal ends 21a and 22a of the lead wires 21, 22 in spaced relation one to the other. Connected to the terminal ends is resistance means including a wire 32, which bridges the terminal ends of the lead wires and is connected thereto. As may be noted from FIG. 4, at least the resistance means is positionable in the primary ignition substance 25.

As shown in FIG. 4, the primary ignition substance is preferably located adjacent the aperture 27 or in close proximity thereto so that the lighter element 30 may be positioned into the ignition substance easily and quickly. In addition, the insulating means, which may be composed of any dielectric which will maintain the wires 21a and 21b apart, may be composed of a bored ceramic plug having bores 31a and 31b respectively to permit insertion thereinto of the wires 21 and 22.

The resistance means or bridge wire 32 should be composed of a high resistance element which may easily be heated to a temperature sufficient to cause ignition of the primary ignition substance 25 upon current passing through the wires 21 and 22. Such a metal as tungsten or ordinary lamp filament wire may serve as the resistance wire.

In order to reduce current drain so that the bridge resistance or resistance means does not have to be heated excessively, the primary ignition substance should have a low flash point preferably between 300° and 400° F., and nominally about 370°. In a like manner, the secondary ignition substance should be chemically slower in burning than the primary ignition substance and should reach ignition after the primary ignition substance 25 has been ignited, the ignition temperature of secondary slow burning fuel being in the range of 500° to 600° F. In this manner the wick 23 will become ignited and, if the cover 13 is composed of a material such as a plastic, it will easily burn off upon ignition of the fuel 19 within the smudge pot 10.

In operation the source of E.M.F. 18 is connected through the switch 17 and the lighters of the smudge pots may be connected electrically in parallel so that any number of the igniter elements may be operated substantially simultaneously. Upon depressing the switch 17, current will flow through the various igniter elements and power supply lead wires 15 causing the resistance means or bridge wire 32 to be heated. Upon the lead wires reaching the ignition temperature of the primary ignition substance 25, the primary ignition substance will be ignited thus causing the secondary ignition substance 26 to be ignited burning the combustible container 20 and causing ignition of the fuel 19.

It should be recognized that although the switch 17 may be manually operable, other switch types may be utilized for automatic ignition of the smudge pots. For example, when using smudge pots in an orchard to prevent frost damage, a thermostatic type switch may be used to automatically close the curcuit and ignite the smudge pots upon a predetermined low temperature being reached.

Thus the igniter of the present invention is useful for remote and substantially simultaneous ignition of smudge pots permitting ignition of smudge pots at the last minute thus permitting the placement of the smudge pots at any time so that they may be remotely ignited when necessary.

Thus although the invention has been described with a certain degree of particularity, it should be understood that the present disclosure is only exemplary of the invention, and that numerous changes in the details of construction, and the combination and arrangement of parts may be made without departing from the spirit and scope of the invention as hereinafter claimed.

What is claimed is:

1. A heating device having a hollow casing composed of a porous noncombustible material and having a solid fuel element therein, an exposed, compressed paper wick on said fuel element, mounted in direct contact therewith an igniter for said solid fuel element, said igniter including a combustible container and a primary and secondary ignition substance in said container, said primary ignition substance has a lower flash point than the secondary ignition substance means defining an aperture in said container and an electrically operated lighter in said container; said lighter including a pair of lead wires passing through said aperture, insulating means separating said lead wires, and a resistance wire bridging and electrically terminating said wires, said resistance wire being positioned in said primary ignition substance.

2. A heating device in accordance with claim 1 wherein said primary ignition substance has a flash point of between 300° and 400° F.

3. A heating device in accordance with claim 1 wherein said secondary ignition substance has an ignition temperature of between 500° and 600° F.

4. A heating device in accordance with claim 1 including a cover above said solid fuel element.

5. A system for igniting a plurality of smudge pots substantially simultaneously, said system including a plurality of smudge pots, at least one igniter in each smudge pot mounted to ignite the same when said igniter is ignited, each of said igniters including a substantially closed, combustible container; a primary and secondary ignition substance in said container, said primary ignition substance has a lower flash point than the secondary ignition substance; means defining an aperture in said container, and an electrically operated lighter in said container; said lighter including a pair of lead wires passing through said aperture; insulating means separating said wires and a resistance wire bridging the terminal ends of said wires, said resistance wire being positioned in said primary ignition substance; a source of E.M.F. adapted for connection to said lead wires for the simultaneous passing of current through said lead wires and resistance means to thereby ignite said primary ignition substance.

References Cited

UNITED STATES PATENTS

| 1,957,701 | 5/1934 | Dart | 44—36 |
| 1,995,354 | 3/1935 | Kirst | 44—36 |
| 2,291,606 | 8/1942 | Chapman et al. | 126—59.5 X |
| 2,821,139 | 1/1958 | Apstein et al. | 102—70.2 |
| 2,882,819 | 4/1959 | Schulz | 102—28 |
| 3,110,845 | 11/1963 | Ott | 317—80 |
| 3,261,346 | 7/1966 | Waddell et al. | 126—59.5 |
| 3,327,505 | 6/1967 | Brown | 126—59.5 X |

VOLODYMYR Y. MAYEWSKY, *Primary Examiner.*

U.S. Cl. X.R.

47—2; 102—28; 126—59.5; 317—80